(12) United States Patent
Woo et al.

(10) Patent No.: US 12,447,219 B2
(45) Date of Patent: Oct. 21, 2025

(54) PERSONAL MOBILITY DEVICE AND CONTROL METHOD THEREOF

(71) Applicants: HYUNDAI MOTOR COMPANY, Seoul (KR); KIA CORPORATION, Seoul (KR)

(72) Inventors: Seunghyun Woo, Seoul (KR); Jae Yul Woo, Seoul (KR); Rowoon An, Seoul (KR); Soobin Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 802 days.

(21) Appl. No.: 17/568,108

(22) Filed: Jan. 4, 2022

(65) Prior Publication Data
US 2022/0257812 A1   Aug. 18, 2022

(30) Foreign Application Priority Data
Feb. 17, 2021   (KR) .................. 10-2021-0020917

(51) Int. Cl.
| | | |
|---|---|---|
| *A61L 2/10* | (2006.01) | |
| *A61L 2/22* | (2006.01) | |
| *A61L 2/24* | (2006.01) | |
| *B62K 21/12* | (2006.01) | |
| *B62K 21/26* | (2006.01) | |

(52) U.S. Cl.
CPC .................. *A61L 2/10* (2013.01); *A61L 2/22* (2013.01); *A61L 2/24* (2013.01); *B62K 21/12* (2013.01); *B62K 21/26* (2013.01); *A61L 2202/11* (2013.01); *A61L 2202/14* (2013.01); *A61L 2202/15* (2013.01); *A61L 2202/17* (2013.01); *A61L 2202/182* (2013.01)

(58) Field of Classification Search
CPC ..... A61L 2/10; A61L 2/22; A61L 2/24; A61L 2202/15; B62K 21/12; B62K 21/26
See application file for complete search history.

(56) References Cited

U.S. PATENT DOCUMENTS

| | | | |
|---|---|---|---|
| 2015/0190538 A1* | 7/2015 | Olvera | ............ A61L 2/24 250/455.11 |
| 2018/0178823 A1 | 6/2018 | Yang et al. | |
| 2020/0368379 A1* | 11/2020 | Agarwal | ............ A61L 2/24 |

FOREIGN PATENT DOCUMENTS

| | | | | |
|---|---|---|---|---|
| CN | 102171129 A | | 8/2011 | |
| CN | 207045586 U | * | 2/2018 | |
| CN | 107745776 A | * | 3/2018 | |
| CN | 108068946 A | * | 5/2018 | |
| CN | 207644551 U | | 7/2018 | |
| CN | 108674561 A | * | 10/2018 | ............ A47K 10/18 |
| CN | 208264476 U | | 12/2018 | |

* cited by examiner

*Primary Examiner* — Donald R Spamer
*Assistant Examiner* — Kayla Rose Sarantakos
(74) *Attorney, Agent, or Firm* — MCDONNELL BOEHNEN HULBERT & BERGHOFF LLP

(57) ABSTRACT

A personal mobility device including handle grips coupled to both ends of a handle, a sterilization and drying unit disposed inside a frame of the handle and including an ultraviolet (UV) generator and a fan, and a controller configured to turn on the UV generator and the fan, based on the handle grips being positioned inside the frame.

12 Claims, 8 Drawing Sheets

PERSONAL MOBILITY DEVICE AND CONTROL METHOD THEREOF

CROSS REFERENCE TO RELATED APPLICATIONS

This application is based on and claims priority under 35 U.S.C. § 119 to Korean Patent Application No. 10-2021-0020917, filed on Feb. 17, 2021 in the Korean Intellectual Property Office, the disclosure of which is incorporated herein by reference.

TECHNICAL FIELD

The disclosure relates to a personal mobility device and a control method thereof.

BACKGROUND

A personal mobility device is a personal mode of transportation including an electric wheel, an electric kick scooter, an electric skateboard and/or an electric bike. Due to an increase in demand for personal mobility devices, the number of personal mobility sharing companies has increased.

Recently, however, many people are concerned about the use of personal mobility devices because of the effect of contagious diseases. In particular, personal mobility users' anxiety is increasing, since they may be infected with contagious diseases through handle grips and helmets that many people come into direct contact with.

Conventionally, personal mobility sharing companies have disinfected and cleaned the handle grips and helmets of personal mobility devices themselves for maintenance. However, such a method may not sufficiently relieve the users' anxiety about infection.

SUMMARY

An aspect of the disclosure provides a personal mobility device and a control method thereof that may perform automatic cleaning of handle grips of the personal mobility device.

For instance, the personal mobility device and the control method thereof may enable the handle grips of the personal mobility device to be exposed only when in use. Also, the personal mobility device and the control method thereof may clean the handle grips for maintenance when a user uses the personal mobility device and/or finishes using the personal mobility device.

Additional aspects of the disclosure will be set forth in part in the description which follows and, in part, will be obvious from the description, or may be learned by practice of the disclosure.

According to an embodiment of the disclosure, there is provided a personal mobility device including handle grips coupled to both ends of a handle, an ultraviolet (UV) generator disposed inside a frame of the handle, and a controller configured to turn on the UV generator, based on the handle grips being positioned inside the frame.

The personal mobility device further includes a fan disposed inside a frame of the handle, and a disinfectant spray configured to spray a disinfectant to an inside of the frame. The controller is configured to control the disinfectant spray to spray the disinfectant to the inside of the frame, based on the handle grips moving from the inside of the frame to an outside of the frame or the handle grips moving from the outside of the frame to the inside of the frame, and turn on the fan after spraying the disinfectant.

The disinfectant spray includes a disinfectant storage tank configured to store the disinfectant, an inlet connected to the disinfectant storage tank and configured to enable the disinfectant to be injected, a steering tube connected to the disinfectant storage tank, and a nozzle connected to the steering tube and configured to spray the disinfectant.

The personal mobility device further includes a communicator. The controller is configured to control the handle grips to move from the inside of the frame to the outside of the frame, based on a signal received through the communicator.

The controller is configured to control the handle grips to move from the outside of the frame to the inside of the frame, based on an identification of an end of driving of the personal mobility device.

A support member whose length is variable and configured to support the handle grips is mounted inside of the frame, the handle grips move to the outside of the frame when the controller controls the support member to increase a length of the support member in a first direction corresponding to a direction of the outside of the frame, and the handle grips move to the inside of the frame when the controller controls the support member to decrease the length of the support member in a second direction corresponding to a direction of the inside of the frame.

The personal mobility device further includes a cleaning member disposed at least a portion of an upper part of each of the handle grips, and the controller is configured to control the cleaning member to repeatedly move in the first direction corresponding to the direction of the outside and in the second direction corresponding to the direction of the inside and opposite to the first direction, based on the moving of the handle grips.

Each of the handle grips is constructed by coupling a plurality of cover members, and each of the plurality of cover members includes a spring and moves from top to bottom according to an upward movement of the cleaning member.

The plurality of cover members include a first cover member, a second cover member, a third cover member and a fourth cover member sequentially arranged from the second direction to the first direction, and the cleaning member is positioned on upper ends of the first cover member and the third cover member or upper ends of the second cover member and the fourth cover member.

The repeated moving of the cleaning member in the first direction and the second direction includes a repeated movement of the cleaning member between the upper ends of the first cover member and the third cover member and the upper ends of the second cover member and the fourth cover member.

According to an embodiment of the disclosure, there is provided a control method of a personal mobility device, the control method includes identifying whether handle grips coupled to both ends of a handle are positioned inside a frame of the handle, and turning on a UV generator based on the handle grips being positioned inside the frame, the UV generator being disposed inside the frame.

The control method further includes spraying, by a disinfectant spray, a disinfectant to the inside of the frame, based on the handle grips moving from the inside of the frame to an outside of the frame or the handle grips moving from the outside of the frame to the inside of the frame, and turning on a fan after spraying the disinfectant.

The control method further includes controlling the handle grips to move from the inside of the frame to the outside of the frame, based on a signal received through a communicator of the personal mobility device.

The control method further includes controlling the handle grips to move from the outside of the frame to the inside of the frame, based on an identification of an end of driving of the personal mobility device.

The control method further includes controlling a cleaning member to repeatedly move in a first direction corresponding to a direction of the outside and in a second direction corresponding to a direction of the inside and opposite to the first direction, based on the moving of the handle grips.

Each of the handle grips is configured by coupling a plurality of cover members, and each of the plurality of cover members includes a spring and moves from top to bottom according to an upward movement of the cleaning member.

The plurality of cover members include a first cover member, a second cover member, a third cover member and a fourth cover member sequentially arranged from the second direction to the first direction, and the cleaning member is positioned on upper ends of the first cover member and the third cover member or upper ends of the second cover member and the fourth cover member.

The repeated moving of the cleaning member in the first direction and the second direction includes a repeated movement of the cleaning member between the upper ends of the first cover member and the third cover member and the upper ends of the second cover member and the fourth cover member.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Figure 1:
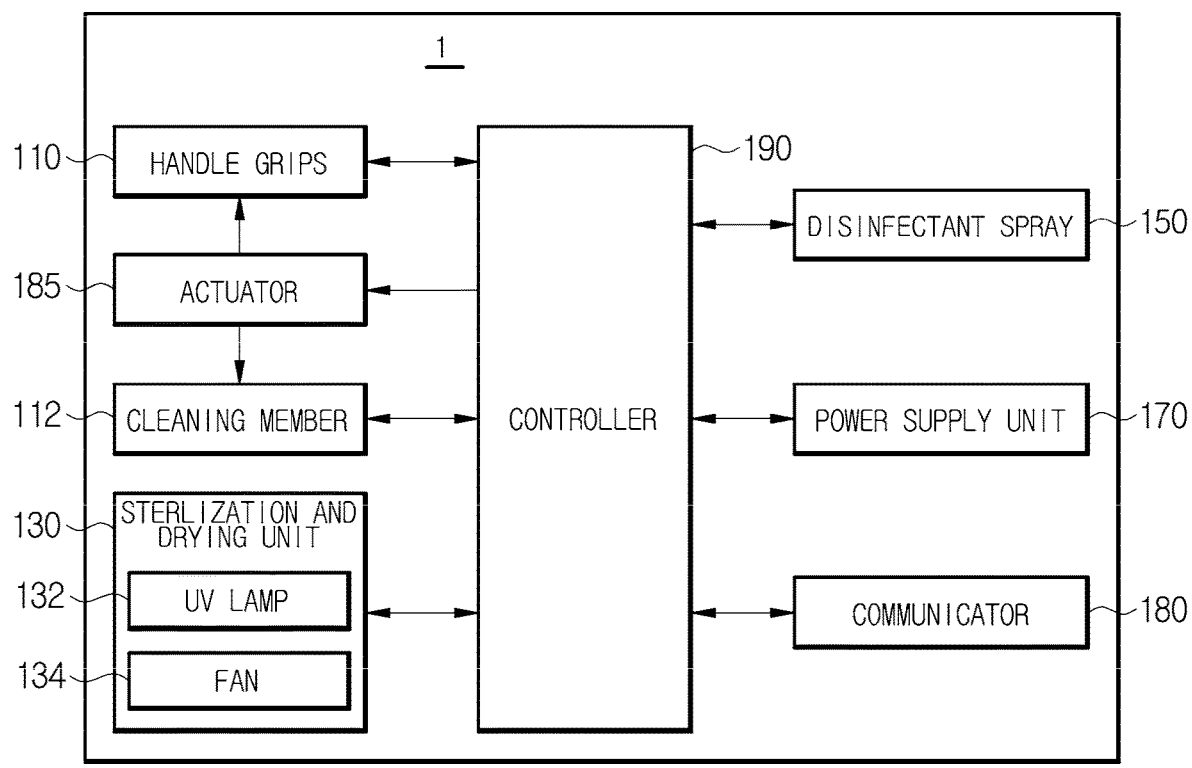
FIG. 1 is a block diagram illustrating a personal mobility device 1 according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~device", "~module", and the like may refer to a unit for processing at least one function or act. For example, the terms may refer to at least process processed by at least one hardware or software. According to embodiments, a plurality of "~parts", "~devices", or "~modules" may be embodied as a single element, or a single of "~part", "~device", or "~module" may include a plurality of elements.

It will be understood that when an element is referred to as being "connected" to another element, it can be directly or indirectly connected to the other element, wherein the indirect connection includes "connection" via a wireless communication network.

It will be understood that the terms "include" when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 is a block diagram illustrating a personal mobility device 1 according to an embodiment.

Referring to FIG. 1, the personal mobility device 1 may include a handle grip 110, a cleaning member 112, a sterilization and drying unit 130, a disinfectant spray 150, a power supply unit 170, a communicator 180, an actuator 185 and/or a controller 190.

The handle grip 110 may move in a first direction and/or a second direction opposite to the first direction based on a control of the controller 190.

The handle grip 110 may have a cylindrical shape in a manner that a portion of an exterior of the handle grip 110 may be protruded and the other portion may be recessed.

The cleaning member 112 (also referred to as a cleaning brush) may be disposed on at least a portion of an upper end of the handle grip 110. For example, the cleaning member 112 may be implemented to be attachable and/or detachable to the handle grip 110.

The cleaning member 112 may move in the first direction and/or the second direction based on the control of the controller 190.

A protrusion part of the handle grip 110 may be cleaned according to the movement of the cleaning member 112.

The sterilization and drying unit 130 may be turned on based on the control of the controller 190, and operate to sterilize and dry the handle grip 110.

The sterilization and drying unit 130 may include an ultraviolet (UV) lamp 132 (also referred to as a UV generator) and a fan 134. The UV lamp 132 and the fan 134 may be turned on and/or off based on the control of the controller 190. The UV lamp 132 may generate ultraviolet rays. The fan 134 may rotate and generate a flow of air.

The disinfectant spray 150 may spray a disinfectant based on the control of the controller 190, for sterilizing the handle grip 110.

The power supply unit 170 may supply power to each constituent component (the handle grip 110, the cleaning member 112, the sterilization and drying unit 130, the disinfectant spray 150, the communicator 180, the actuator 185 and/or the controller 190) of the personal mobility device 1. For example, the power supply unit 170 may include a battery.

The communicator 180 (also referred to as a communication device or a communication circuit) may establish a wired communication channel between the personal mobility device 1 and an external device, e.g. a user terminal (not shown) and/or a server (not shown), and support communication through the established communication channel. For example, the communicator 180 may include a wireless communication module (e.g. a cellular communication module, a Wi-Fi communication module, a local wireless communication module (a Bluetooth communication module), or a global navigation satellite system (GNSS) communication module) to communicate with the external device. The communicator 180 may include a communication circuit.

The actuator 185 may include a motor (not shown), and enable the handle grip 110 and/or the cleaning member 112 to move based on the control of the controller 190.

The controller 190 (also referred to as a control device, a control circuit or a processor) may control at least one other constituent component of the personal mobility device 1 (e.g., a hardware constituent component such as the handle grip 110, the cleaning member 112, the sterilization and drying unit 130, the disinfectant spray 150, the power supply unit 170, the communicator 180, and/or the actuator 185) or a software (software program). Also, the controller 190 may perform various data processing and data operations, and include a processor and a memory.

Although it has been described above that the cleaning member 112 is formed separately from the handle grip 110, the cleaning member 112 according to another embodiment may be included in the handle grip 110.

Figure 2:
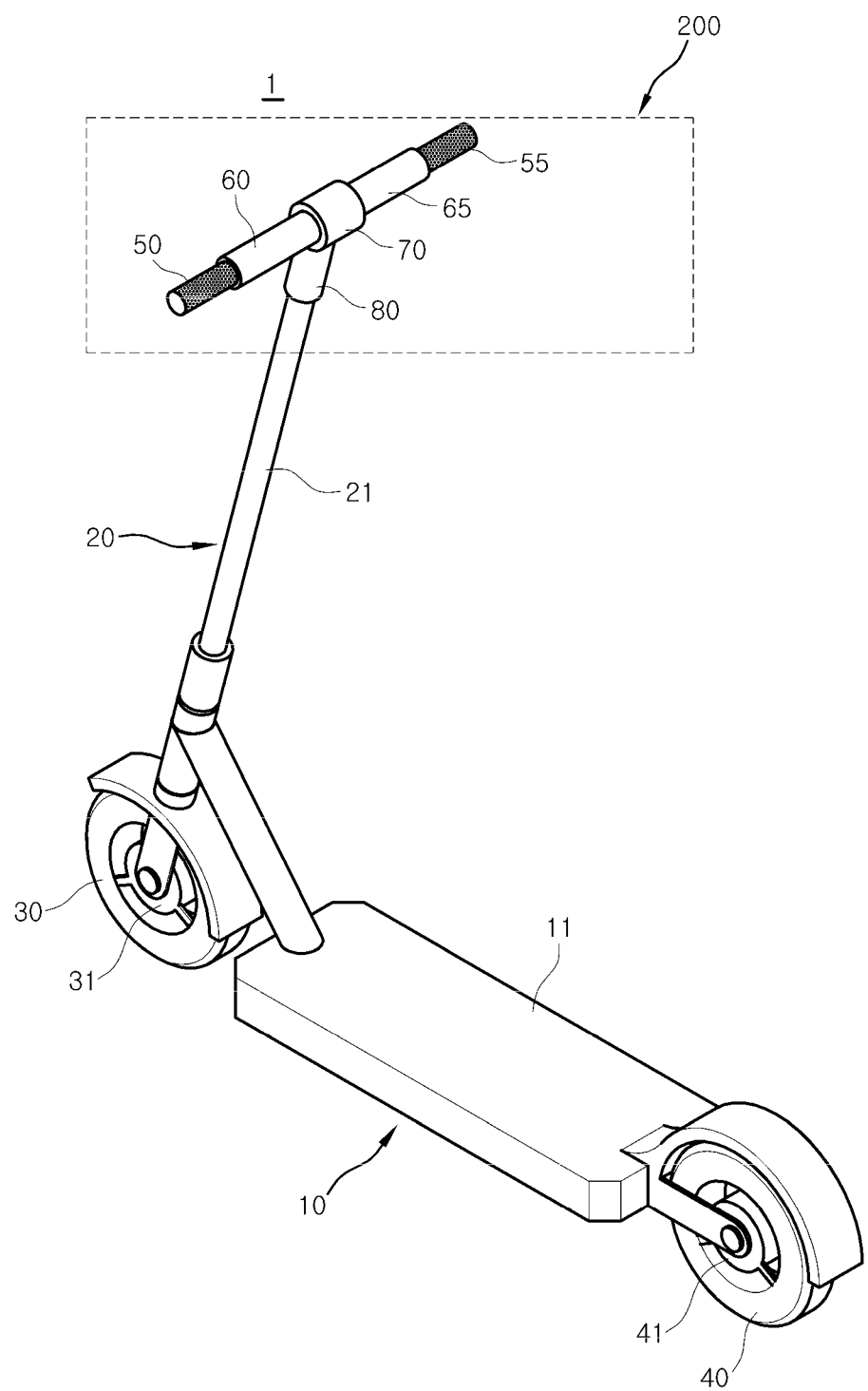
FIG. 2 is a diagram illustrating a personal mobility device according to an embodiment.
Figure 3:
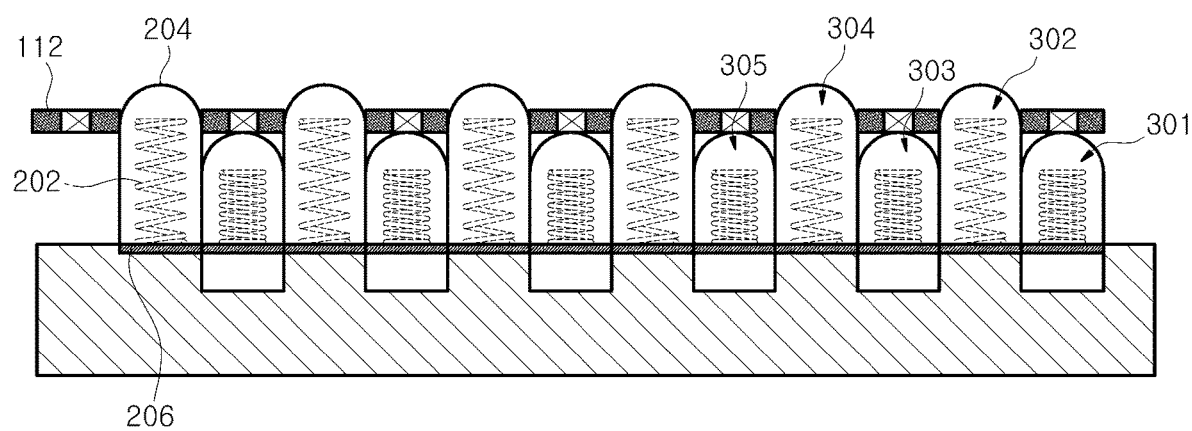
FIGS. 3, 4, and 5 are diagrams illustrating a portion of constituent components of a personal mobility device according to an embodiment.
Figure 4:
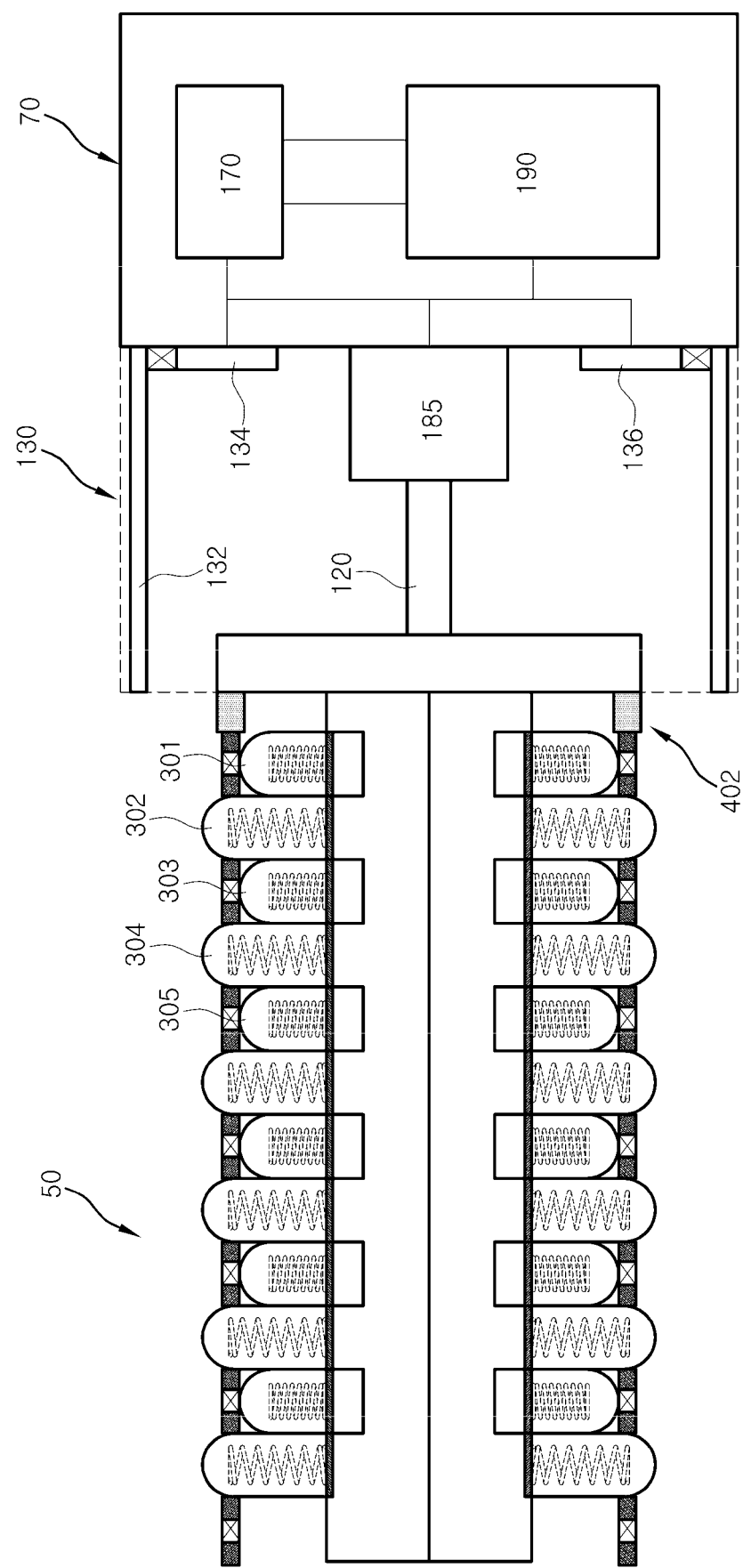
Figure 5:
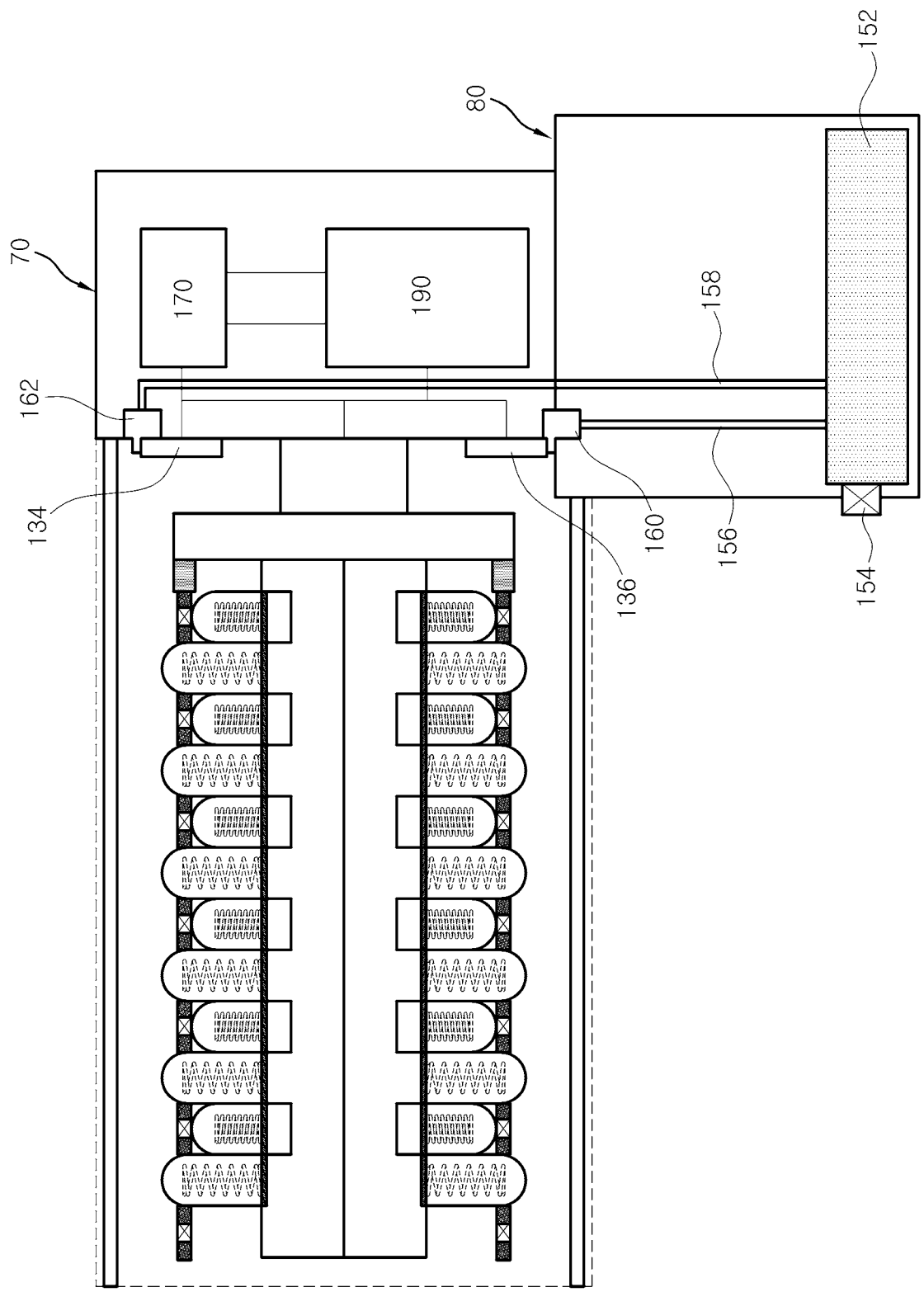

FIG. 2 is a diagram illustrating a personal mobility device 1 according to an embodiment. FIGS. 3 to 5 are diagrams illustrating a portion of constituent components of the personal mobility device 1 according to an embodiment.

Referring to FIG. 2, the personal mobility device 1 may include a body 10, a steering device 20, a front wheel 30 and a rear wheel 40. The body 10 includes a footrest 11 thereon, and the steering device 20 is provided in front of the body 10. The front wheel 30 is mounted at a lower end of the steering device 20 and the rear wheel 40 is mounted at a rear end of the body 10. The front wheel 30 and the rear wheel 40 may include driving motors 31 and 41 for driving and braking devices for braking, respectively. The steering device 20 may include a steering stem 21 mounted rotatably in front of the body 10.

The personal mobility device 1 may include a handle 200 coupled to an upper end of the steering stem 21.

Both ends of the handle 200 of the personal mobility device 1 may be coupled to handle grip 110, e.g. a first handle grip 50 and a second handle grip 55.

For instance, the handle 200 of the personal mobility device 1 may include the first handle grip 50, the second handle grip 55, a first frame 60 coupled to the first handle grip 50, a second frame 65 coupled to the second handle grip 55, a third frame 70 and a fourth frame 80. The first frame 60 and the second frame 65 may be disposed at both ends of the third frame 70, respectively, and the fourth frame 80 may be disposed at a lower end of the third frame 70. The fourth frame 80 may be coupled to an upper end of the steering stem 21.

At least a portion of surface of the first handle grip 50 and/or the second handle grip 55 may have a plurality of holes therein (also referred to as a punch structure), and the first handle grip 50 and the second handle grip 55 have a structure corresponding to each other.

Hereinafter, each of the first handle grip 50 and the second handle grip 55 may be referred to as a handle grip.

Referring to FIG. 3, each of the handle grips 50 and 55 may include a cover member 204 and/or a stopper 206 disposed at a lower end of the cover member 204.

A plurality of cover members 204 are provided, and each of the handle grips 50 and 55 may be formed in a cylindrical shape by coupling the plurality of cover members 204.

The plurality of cover members 204 may move in an upward and/or downward direction according to a movement of the cleaning member 112.

For instance, a spring 202 may be positioned inside of each of the plurality of cover members 204. As the cleaning member 112 moves to an upper end or a periphery of each of the cover members 204, the spring 202 moves in an upward and/or downward direction, and thus each of the cover members 204 may move in an upward and/or downward direction.

A portion of each of the handle grips 50 and 55 may be protruded or the other portion may be recessed, and the plurality of holes of each of the handle grips 50 and 55 may be seen, according to the movement of each of the cover members 204.

For example, according to the upward and/or downward movement of the cover members 204, cover members in contact with each of protruding cover members may be recessed and cover members in contact with each of the recessed cover members may be protruded.

An upper end of each of the cover members 204 may be formed in a round shape, and thereby may enable a portion of the cleaning member 112 to easily move on each of the cover members 204.

The stopper 206 (also referred to as a spring stopper) may be connected to an end of the spring 202 and support the plurality of cover members 204.

The cleaning member 112 may be positioned on upper ends of a portion of the plurality of cover members 204.

The cleaning member 112 may move in a first direction and/or a second direction based on a control of the controller 190. For instance, the cleaning member 112 may move to upper ends of a portion of the plurality of cover members and/or move from the upper ends of the portion of cover members to upper ends of the other cover members.

According to repeated movement of the cleaning member 112 in the first direction and/or the second direction, the spring 202 of each of the cover members 204 may repeatedly move in an upward and/or downward direction. Also, according to the repeated movement of the spring 202, the cover members 204 may repeatedly move in an upward and/or downward direction.

For instance, referring to FIG. 3, when the cover members 204 include a first cover member 301, a second cover member 302, a third cover member 303, a fourth cover member 304, and a fifth cover member 305 which are sequentially arranged in a widthwise direction, a portion of the cleaning member 112 may be positioned on upper ends of the first cover member 301, the third cover member 303 and the fifth cover member 305, which may be in a grid form.

According to the movement of the cleaning member 112 the first direction and/or the second direction, a portion of the cleaning member 112 may repeatedly move from the upper ends of the first, the third and the fifth cover members 301, 303 and 305 to the upper ends of the second and fourth cover members 302 and 304.

A support member 120, the sterilization and drying unit 130 and the actuator 185 may be disposed an inside of each of the first and second frames 60 and 65. The support member 120 supports each of the handle grips 50 and 55.

Referring to FIG. 4, inside the first frame 60, the UV lamp 132 of the sterilization and drying unit 130 may be disposed in an upper end and lower end of the first frame 60. Also, fans 134 and 136 of the sterilization and drying unit 130 may be disposed in a side surface of the first frame 60, and also the actuator 185 may be disposed in the side surface of the first frame 60. Here, the side surface of the first frame 60 is in contact with the third frame 70, and a plurality of fans may be provided. For example, the fans 134 and 136 may be disposed in an upper side and a lower side of the side surface of the first frame 60, respectively, and the actuator 185 may be disposed in a center of the side surface of the first frame 60.

The support member 120 connected to the first handle grip 50 and one side of the actuator 185 may support the first handle grip 50. The support member 120 may be a structure whose length is reduced while being folded toward the actuator 185, and whose length is increased while unfolding toward an opposite side of the actuator 185. A change in length of the support member 120 may be made based on driving of the actuator 185.

A switch member 402 connected to a portion of the cleaning member 112 of the first handle grip 50 may be disposed in a portion of the support member 120. For instance, wires may be placed inside or outside of the support member 120, and the wires may electrically connect the switch member 402 and the actuator 185.

The switch member 402 may be implemented as a structure capable of performing a pull-up and/or pull-down operation based on a control of the controller 190. The cleaning member 112 may move in one direction according to the pull-up operation of the switch member 402, and move in another direction opposite to the one direction according to the pull-down operation of the switch member 402.

For instance, as shown in FIG. 4, the cleaning member 112 may move and be positioned on the upper ends of the first, third and fifth cover members 301, 303 and 305 according to the pull-up operation of the switch member 402. Although not illustrated, for example, the cleaning member 112 may move and be positioned on the upper ends of the second and fourth cover members 302 and 304 according to the pull-down operation of the switch member 402.

As shown in FIG. 4, the power supply unit 170 and the controller 190 may be disposed inside the third frame 70. Wires of the support member 120, the power supply unit 170, the controller 190, the UV lamp 132, the fan 134 and/or the actuator 185 may be electrically connected to each other. Constituent components of the disinfectant spray 150 may be disposed inside the fourth frame 80.

Referring to FIG. 5, the disinfectant spray 150 may include a disinfectant storage tank 152, a disinfectant inlet 154, at least one steering tubes 156 and 158, and nozzles 160 and 162. The disinfectant storage tank 152 stores a disinfectant, and the disinfectant inlet 154 is connected to the disinfectant storage tank 152 and enables the disinfectant to be injected. The at least one steering tubes 156 and 158 are connected to the disinfectant storage tank 152, and the nozzles 160 and 162 are connected to the at least one steering tubes 156 and 158, respectively.

The nozzles 160 and 162 may be placed adjacent to the fans 134 and 136, respectively, inside the first frame 60.

Referring to FIG. 5, the first handle grip 50 may move inside the first frame 60, e.g. the second direction, based on the control of the controller 190.

While the first handle grip 50 is moving inside the first frame 60 and/or in a state where the first handle grip 50 move inside the first frame 60, the disinfectant spray 150 may spray the disinfectant stored in the disinfectant storage tank 152 though the nozzles 160 and 162 connected to the steering tube 156 based on the control of the controller 190, and thereby may sterilize the first handle grip 50.

While the first handle grip 50 is moving inside the first frame 60 and/or in a state where the first handle grip 50 move inside the first frame 60, the UV lamp 132 and/or the fan 134 of the sterilization and drying unit 130 may be turned on based on the control of the controller 190, and thereby may sterilize and/or dry the first handle grip 50.

Although it has been described above that the actuator 185 is disposed inside the first frame 60, the actuator 185 may be disposed inside the third frame 70 according to another embodiment.

Also, although not illustrated, an internal configuration of the second frame 65 may correspond to that of the first frame 60. For example, the second frame 65 may include constituent components corresponding to the above-described constituent components of the first frame 60 to enable the second handle grip 55 to move inside and/or outside of the second frame 65 based on the control of the controller 190. In addition, the second frame 65 may include constituent components corresponding to the above-described constituent components of the first frame 60 to enable the second handle grip 55 to be sterilized and dried based on the control of the controller 190.

Figure 6:
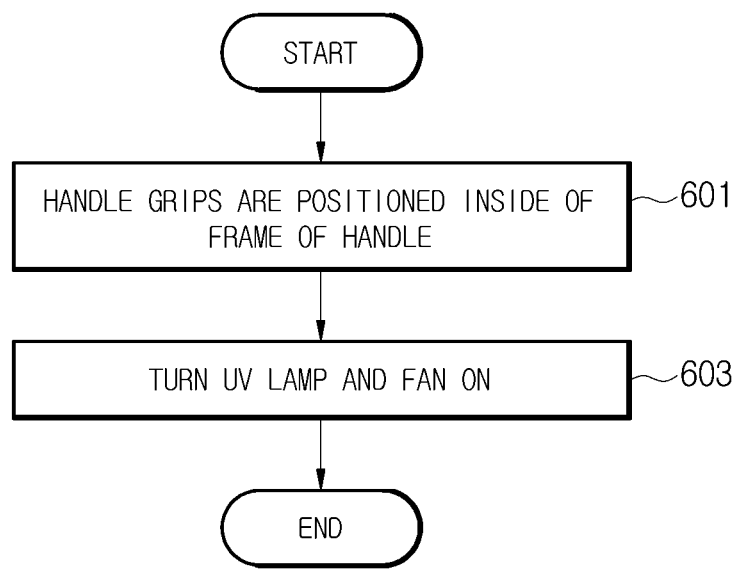
FIG. 6 is a flowchart illustrating operations of a personal mobility device according to an embodiment.

FIG. 6 is a flowchart illustrating operations of the personal mobility device 1 (and/or the controller 190 of the personal mobility device 1) according to an embodiment.

The personal mobility device 1 may identify whether the handle grip 110 is positioned inside of a frame of the handle 200 at 601. For example, the personal mobility device 1 may identify whether the first handle grip 50 is positioned inside of the first frame 60 and the second handle grip 55 is positioned inside of the second frame 65.

The personal mobility device 1 may turn on the UV lamp 132 and the fan 134, based on the handle grip 110 being positioned inside of the frame of the handle 200 at 603.

The UV lamp 132 may generate ultraviolet rays and the fan 134 may rotate and generate a flow of air when the UV lamp 132 and the fan 134 are turned on. Accordingly, the handle grip 110 in the frame of the handle 200 may be sterilized and dried.

The UV lamp 132 and the fan 134 may be disposed inside of each of the first frame 60 and the second frame 65. The personal mobility device 1 may turn on the UV lamp 132 and the fan 134 in each of the first frame 60 and the second frame 65, based on the first handle grip 50 being positioned inside of the first frame 60 and the second handle grip 55 being positioned inside of the second frame 65.

In addition to the embodiment described above, the personal mobility device 1 may control the disinfectant spray 150 to spray a disinfectant to inside a frame, based on a movement of the handle grip 110 from the inside of the frame of the handle 200 to an outside or from the outside of the frame of the handle 200 to the inside.

Each nozzle of the disinfectant spray 150 may be connected to an inside of each of the first frame 60 and the second frame 65. The personal mobility device 1 may spray the disinfectant through the disinfectant spray 150 connected to the inside of the first frame 60, based on a movement of the first handle grip 50 from the inside of the first frame 60 to an outside or from the outside of the first frame 60 to the inside.

The personal mobility device 1 may spray the disinfectant through the disinfectant spray 150 connected to the inside of the second frame 65, based on a movement of the second handle grip 55 from the inside of the second frame 65 to an outside or from the outside of the second frame 65 to the inside.

In addition to the embodiment described above, the personal mobility device 1 may move the handle grip 110 from the inside of the frame of the handle 200 to the outside, based on a signal (e.g. a standby signal for driving of the personal mobility device 1) received through the communicator 180 of the personal mobility device 1.

For instance, the personal mobility device 1 may move the first handle grip 50 from the inside of the first frame 60 to the outside based on the signal received through the communicator 180 of the personal mobility device 1. Also, the personal mobility device 1 may move the second handle grip 55 from the inside of the second frame 65 to the outside based on the signal received through the communicator 180 of the personal mobility device 1.

In addition to the embodiment described above, the personal mobility device 1 may move the handle grip 110 from the outside of the frame of the handle 200 to the inside, based on an identification of an end of driving of the personal mobility device 1.

For example, the personal mobility device 1 may identify the end of driving of the personal mobility device 1, when an off signal of the personal mobility device 1 is identified.

As another example, the handle grip 110 of the personal mobility device 1 may include a touch detection sensor, a grip sensor, and/or a pressure sensor, and identify whether a user's hand is positioned on the handle grip 110 of the personal mobility device 1 based on a sensing signal of the above sensors. When identifying that the user's hand is not positioned on the handle grip 110 for a predetermined period of time, the personal mobility device 1 may identify the end of driving of the personal mobility device 1.

For instance, the personal mobility device 1 may move the first handle grip 50 from the outside of the first frame 60 to the inside, based on the identification of the end of driving of the personal mobility device 1. Also, the personal mobility device 1 may move the second handle grip 55 from the outside of the second frame 65 to the inside, based on the identification of the end of driving of the personal mobility device 1.

The movement of the first handle grip 50 from the outside of the first frame 60 to the inside and the movement of the second handle grip 55 from the outside of the second frame 65 to the inside may be performed by controlling a length of the support member 120 to increase in a first direction corresponding to a direction of the outside of the frame. Here, the support member 120 supports each of the handle grips 50 and 55.

Also, the movement of the first handle grip 50 from the inside of the first frame 60 to the outside and the movement of the second handle grip 55 from the inside of the second frame 65 to the outside may be performed by controlling a length of the support member 120 to decrease in a second direction corresponding to a direction of the inside of the frame.

In addition to the embodiment described above, for cleaning the handle grip 110, the personal mobility device 1 may control the cleaning member 112 to repeatedly move in the first direction corresponding to the direction of the outside and in the second direction corresponding to the direction of the inside and opposite to the first direction, based on the movement of the handle grip 110.

For instance, the repeated movement of the cleaning member 112 in the first and second directions may include a repeated movement of the cleaning member 112 between upper ends of the first, third and fifth cover members 301, 303 and 305 and upper ends of the second and fourth cover members 302 and 304.

Figure 7:
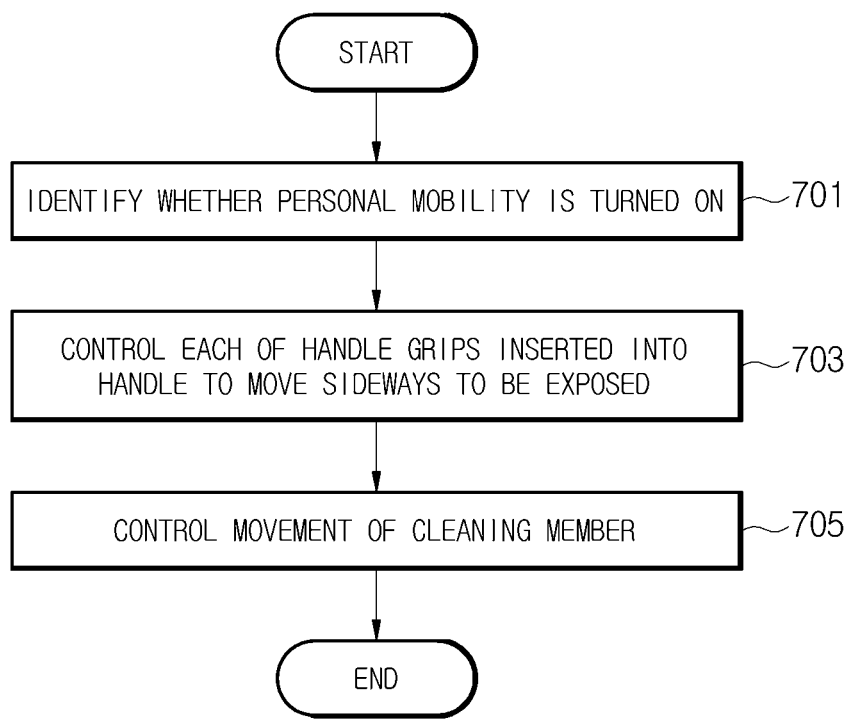
FIG. 7 is a flowchart illustrating operations of a personal mobility device according to an embodiment.

FIG. 7 is a flowchart illustrating operations of the personal mobility device 1 (and/or the controller 190 of the personal mobility device 1) according to an embodiment.

The personal mobility device 1 may identify whether the personal mobility device 1 is turned on at 701. The personal mobility device 1 may be in a standby driving mode for standby of driving of the personal mobility device 1, in response to the identification of the turn on the personal mobility device 1.

The personal mobility device 1 may control each of the handle grips 50 and 55 inserted into the handle 200 to move sideways to be exposed at 703.

The personal mobility device 1 may control each of the handle grips 50 and 55 inserted into the handle 200 to move to be exposed, based on the identification of the turn on the personal mobility device 1, e.g. entering the standby driving mode.

For example, the personal mobility device 1 may control the first handle grip 50 inserted into the first frame 60 to move in an outward direction of the first handle grip 50 (also referred to as a first direction) to be exposed. The personal mobility device 1 may control the second handle grip 55 inserted into the second frame 65 to move in an outward direction of the second handle grip 55 to be exposed.

The personal mobility device 1 may control a movement of the cleaning member 112 positioned on at least a portion of upper ends of each of the handle grips 50 and 55 at 705.

For instance, the personal mobility device 1 may control the cleaning member 112 to repeatedly move in the first direction and/or a second direction opposite to the first direction. Each of the handle grips 50 and 55 of the personal mobility device 1 may be cleaned according to the control of the movement of the cleaning member 112.

The personal mobility device 1 may simultaneously control the movement of each of the handle grips 50 and 55 in the outward direction and the movement of the cleaning member 112 positioned on a portion of the upper ends of each of the handle grips 50 and 55. Accordingly, each of the handle grips 50 and 55 of the personal mobility device 1 is exposed outwardly and may be cleaned simultaneously.

According to the embodiment described above, each of the handle grips 50 and 55 of the personal mobility device 1 may be cleaned before a user uses the personal mobility device 1.

Figure 8:
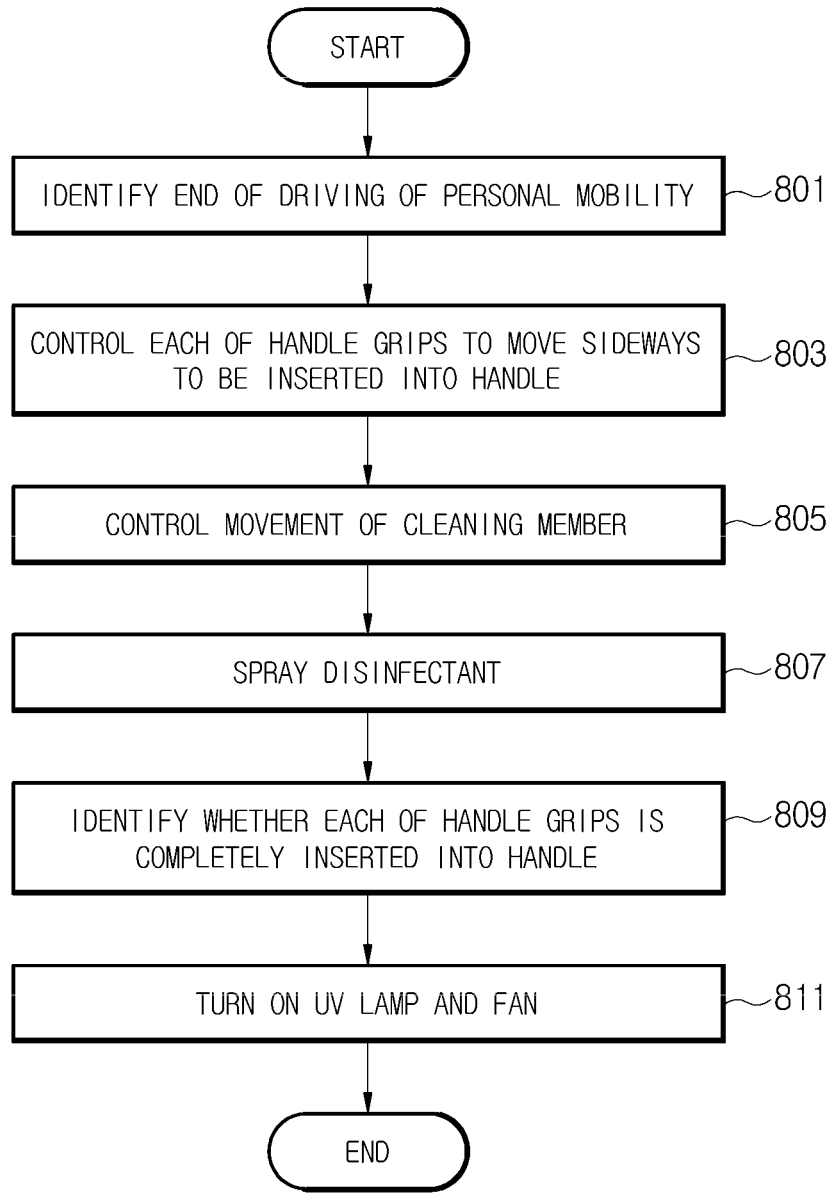
FIG. 8 is a flowchart illustrating operations of a personal mobility device according to an embodiment.

FIG. 8 is a flowchart illustrating operations of the personal mobility device 1 (and/or the controller 190 of the personal mobility device 1) according to an embodiment.

The personal mobility device 1 may identify an end of driving of the personal mobility device 1 at 801. The personal mobility device 1 may identify the end of driving of the personal mobility device 1 based on a signal (e.g. a driving end signal) received through the communicator 180 of the personal mobility device 1. Also, the personal mobility device 1 may identify the end of driving of the personal mobility device 1 based on a signal (e.g. a driving termination signal) received via button input, etc.

The personal mobility device 1 may control each of the handle grips 50 and 55 to move sideways to be inserted into the handle 200 at 803. The personal mobility device 1 may control each of the handle grips 50 and 55 to move to be inserted into the handle 200, in response to the identification of the end of driving of the personal mobility device 1.

The personal mobility device 1 may control a movement of the cleaning member 112 at 805. Each of the handle grips 50 and 55 of the personal mobility device 1 may be cleaned according to the control of the movement of the cleaning member 112.

For example, an end of a movement control operation of the cleaning member 112 may correspond to an end of the movement of each of the handle grips 50 and 55. Alternatively, the movement control operation of the cleaning member 112 may be set to finish after the lapse of a preset operation time.

The personal mobility device 1 may simultaneously control the sideward movement of each of the handle grips 50 and 55 and the movement of the cleaning member 112. Accordingly, each of the handle grips 50 and 55 of the personal mobility device 1 is inserted into the handle 200 and may be cleaned simultaneously.

The personal mobility device 1 may control the disinfectant spray 150 to spray a disinfectant at 807. The personal mobility device 1 may control the disinfectant spray 150 to spray the disinfectant based on the movement control of the cleaning member 112.

For example, while each of the handle grips 50 and 55 is inserted into the handle 200, the personal mobility device 1 may control the cleaning member 112 to move and simultaneously control the disinfectant spray 150 to spray the disinfectant a predetermined number of times.

The personal mobility device 1 may identify whether each of the handle grips 50 and 55 is completely inserted into the handle 200 at 809. The personal mobility device 1 may turn on the UV lamp 132 and the fan 134 in response to the identifying that each of the handle grips 50 and 55 is completely inserted into the handle 200 at 811.

When the UV lamp 132 and the fan 134 are turned on, each of the handle grips 50 and 55 that is completely inserted into the handle 200 may be sterilized and dried. After the lapse of a predetermined period of time, the personal mobility device 1 may turn off the UV lamp 132 and the fan 134.

Meanwhile, according to the embodiment, it has been described above that the personal mobility device 1 may control the cleaning member 112 to move and simultaneously control the disinfectant spray 150 to spray the disinfectant, while each of the handle grips 50 and 55 is inserted into the handle 200.

However, according to another embodiment, the personal mobility device 1 may control the disinfectant spray 150 to spray the disinfectant a predetermined number of times, in response to each of the handle grips 50 and 55 being completely inserted into the handle 200.

As is apparent from the above, according to the embodiment of the disclosure, the personal mobility device and the control method thereof can perform automatic cleaning of handle grips of the personal mobility device. For instance, the personal mobility device according to the embodiment of the disclosure can expose the handle grips only when in use and clean the handle grips simultaneously, without exposing the handle grips all the time. For example, when a user attempts to use the personal mobility device, the handle grips can be disinfected by sequentially performing a cleaning, a disinfectant spraying, a UV sterilization and drying. Accordingly, the user recognizes the cleanliness of the handle grips and can use the personal mobility device without any reluctance.

Also, when the user finishes using the personal mobility device, the personal mobility device can perform an automatic cleaning, sterilization and drying for clean maintenance of the handle grips of the personal mobility device.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

The invention claimed is:

1. A personal mobility device, comprising:
a plurality of handle grips coupled to both ends of a handle;
an ultraviolet (UV) generator positioned inside a frame of the handle; and
a controller configured to turn on the UV generator, based on the plurality of handle grips being positioned inside the frame;
a fan positioned inside the frame of the handle;
a disinfectant spray configured to spray a disinfectant to the inside of the frame; and
a cleaning member positioned at at least a portion of an upper end of each of the plurality of handle grips;
wherein the controller is configured to control the disinfectant spray to spray the disinfectant to the inside of the frame, based on the handle grips moving from the inside of the frame to an outside of the frame, or based on the handle grips moving from the outside of the frame to the inside of the frame, and wherein the controller is further configured to turn on the fan after the spraying of the disinfectant;
wherein the controller is configured to control the cleaning member to repeatedly move in a first direction corresponding to the direction of the outside and in a second direction corresponding to the direction of the inside and opposite to the first direction, based on the movement of the plurality of handle grips;
wherein each of the plurality of handle grips is constructed by coupling a plurality of cover members, and each of the plurality of cover members comprises a spring and moves from top to bottom according to an upward movement of the cleaning member;
wherein the plurality of cover members include a plurality of first cover member and a plurality of second cover members; and
wherein the cleaning member is located on the upper side of one of the plurality of first cover members or the plurality of second cover members.

2. The personal mobility device of claim 1, wherein the disinfectant spray comprises:
a disinfectant storage tank configured to store the disinfectant;
an inlet connected to the disinfectant storage tank and configured to enable the disinfectant to be injected;

a steering tube connected to the disinfectant storage tank; and a nozzle connected to the steering tube and configured to spray the disinfectant.

3. The personal mobility device of claim 1, further comprising:

a communicator, wherein the controller is configured to control the plurality of handle grips to move from the inside of the frame to the outside of the frame, based on a signal received through the communicator.

4. The personal mobility device of claim 1, wherein the controller is configured to control the plurality of handle grips to move from the outside of the frame to the inside of the frame, based on an identification of an end of driving of the personal mobility device.

5. The personal mobility device of claim 1, wherein a support member having a variable length and configured to support the plurality of handle grips is mounted inside of the frame, wherein when the controller controls the support member to increase a length of the support member in a first direction corresponding to a direction of the outside of the frame, the plurality of handle grips move to the outside of the frame, and wherein when the controller controls the support member to decrease the length of the support member in a second direction corresponding to a direction of the inside of the frame, the plurality of handle grips move to the inside of the frame.

6. The personal mobility device of claim 1, wherein the plurality of cover members comprise a first cover member, a second cover member, a third cover member, and a fourth cover member sequentially arranged from the second direction to the first direction, and the cleaning member is positioned on upper ends of the first cover member and the third cover member, or upper ends of the second cover member and the fourth cover member.

7. The personal mobility device of claim 6, wherein the repeated moving of the cleaning member in the first direction and the second direction comprises a repeated movement of the cleaning member between the upper ends of the first cover member and the third cover member, and the upper ends of the second cover member and the fourth cover member.

8. A control method of a personal mobility device, the control method comprising:

identifying whether a plurality of handle grips coupled to both ends of a handle are positioned inside a frame of the handle; and turning on a UV generator based on the plurality of handle grips being positioned inside the frame, the UV generator being disposed inside the frame;

spraying, by a disinfectant spray, a disinfectant to the inside of the frame, based on the plurality of handle grips moving from the inside of the frame to an outside of the frame or the plurality of handle grips moving from the outside of the frame to the inside of the frame;

turning on a fan after spraying the disinfectant;

controlling a cleaning member to repeatedly move in a first direction corresponding to a direction of the outside and in a second direction corresponding to a direction of the inside and opposite to the first direction, based on the moving of the plurality of handle grips;

wherein each of the plurality of handle grips is constructed by coupling a plurality of cover members, and each of the plurality of cover members comprises a spring and moves from top to bottom according to an upward movement of the cleaning member;

wherein the plurality of cover members comprise a first cover member, a second cover member, a third cover member, and a fourth cover member sequentially arranged from the second direction to the first direction; and wherein the cleaning member is positioned on upper ends of the first cover member and the third cover member, or upper ends of the second cover member and the fourth cover member.

9. The control method of claim 8, further comprising:

controlling the plurality of handle grips to move from the inside of the frame to the outside of the frame, based on a signal received through a communicator of the personal mobility device.

10. The control method of claim 8, further comprising:

controlling the plurality of handle grips to move from the outside of the frame to the inside of the frame, based on an identification of an end of driving of the personal mobility device.

11. The control method of claim 8, wherein the repeated moving of the cleaning member in the first direction and the second direction comprises a repeated movement of the cleaning member between the upper ends of the first cover member and the third cover member, and the upper ends of the second cover member and the fourth cover member.

12. The personal mobility device of claim 1, wherein a protruding position of the plurality of first cover members and a protruding position of the plurality of second cover members do not overlap with each other.

* * * * *